US008666163B2

(12) United States Patent
Cho et al.

(10) Patent No.: US 8,666,163 B2
(45) Date of Patent: Mar. 4, 2014

(54) APPARATUS AND METHOD FOR MATCHING COLORS BETWEEN VARIOUS IMAGE DEVICES

(75) Inventors: Maeng-Sub Cho, Daejeon (KR); Song-Woo Lee, Daejeon (KR); Jin-Seo Kim, Daejeon (KR); Ju-Yeon You, Daegu (KR); Soon-Young Kwon, Gyeongsangnam-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 138 days.

(21) Appl. No.: 13/332,653

(22) Filed: Dec. 21, 2011

(65) Prior Publication Data

US 2012/0163717 A1    Jun. 28, 2012

(30) Foreign Application Priority Data

Dec. 23, 2010    (KR) .......................... 10-2010-0133952

(51) Int. Cl.
*G06K 9/00* (2006.01)
(52) U.S. Cl.
USPC ...................................................... 382/167
(58) Field of Classification Search
USPC .......... 382/162, 167; 345/589, 597, 600–605; 348/223.1; 358/1.1, 1.9, 518–520
See application file for complete search history.

(56) References Cited

U.S. PATENT DOCUMENTS

| 7,573,607 | B2* | 8/2009 | Huan et al. ..................... 358/1.9 |
| 7,679,780 | B2* | 3/2010 | Ichitani ........................ 358/1.9 |
| 8,204,304 | B2* | 6/2012 | Suzuki ......................... 382/167 |
| 2008/0080767 | A1 | 4/2008 | Cho et al. |

FOREIGN PATENT DOCUMENTS

KR    2008-0030339 A    4/2008

OTHER PUBLICATIONS

Jan Morovic, et al; "The Fundamentals of Gamut Mapping: A Survey", Draft submitted to the Journal of Imaging Science and Technology, Jul. 2000, pp. 1-36.

* cited by examiner

*Primary Examiner* — Jose Couso
(74) *Attorney, Agent, or Firm* — Ladas & Parry LLP

(57) ABSTRACT

An apparatus for matching colors between various image devices includes a characterization model generation unit configured to generate characterization models for color conversion using gamut information on the image shooting device and the output imaging device; a color conversion unit configured to convert all colors corresponding to a gamut of the image shooting device into colors corresponding to a gamut of the output imaging device using the characterization models; a lookup table generation unit configured to generate a lookup table between the image shooting device and the output imaging device based on color conversion information of the colors corresponding to the gamut of the image shooting device; and an image conversion unit configured to generate an output image of the output imaging device, of which the colors are matched with those of the image inputted from the image shooting device, using the lookup table.

18 Claims, 6 Drawing Sheets

| FULL 3D LOOK-UP TABLE | |
|---|---|
| DEVICE #1 | DEVICE #2 |
| $R_0 G_0 B_0$ | $R'_0 G'_0 B'_0$ |
| ⋮ | ⋮ |
| $R_n G_n B_n$ | $R'_n G'_n B'_n$ |

~185

APPARATUS AND METHOD FOR MATCHING COLORS BETWEEN VARIOUS IMAGE DEVICES

CROSS-REFERENCE(S) TO RELATED APPLICATIONS

This application claims priority to Korean Patent Application No. 10-2010-0133952, filed on Dec. 23, 2010, which is incorporated herein by reference in its entirety.

BACKGROUND OF THE INVENTION

1. Field of the Invention

Exemplary embodiments of the present invention relate to an apparatus and method for matching colors between various image devices; and, particularly, to an apparatus and method for matching colors between various image devices, which is capable of providing an image of which colors are matched between input and output imaging devices.

2. Description of Related Art

Input and output imaging devices (for example, digital cameras, monitors, and screens), which are used in the entire process for digital cinema from a shooting step through an editing step to a final showing step, may exhibit differences in color representation, even in the case of the same model made by the same manufacturer. Such a problem occurs due to the characteristics of the devices and the differences in gamut (color gamut) between the devices.

Therefore, even if theaters use the same projector, the colors of images shown in respective theaters may be perceived differently by audiences due to the color mismatch problem between the image devices. This means that the colors intended by a director during the shooting and post-production stages of movie may be not properly delivered to the audiences.

Furthermore, operators taking part in film production may perform their work on images having different colors. Accordingly, the case in which separate color compensation should be performed on respective pieces of work frequently occurs.

SUMMARY OF THE INVENTION

An embodiment of the present invention is directed to an apparatus and method for matching colors between various image devices, capable of providing an image of which colors are matched between-input and output imaging devices which are used in the entire process for digital cinema from a shooting step to a showing step.

Another embodiment of the present invention is directed to an apparatus and method for matching colors between various image devices, capable of simply converting digital cinema images such that operators taking part in a shooting stage and a post-production stage (editing, synthesizing, DI and so on) and audiences visiting a theater may observe images having the same color.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for matching colors between various image devices includes: a characterization model generation unit configured to generate characterization models for color conversion of an image shooting device and an output imaging device using gamut information on the image shooting device and the output imaging device; a color conversion unit configured to convert all colors corresponding to a gamut of the image shooting device into colors corresponding to a gamut of the output imaging device using the characterization models; a lookup table generation unit configured to generate a lookup table between the image shooting device and the output imaging device based on the color conversion information of the colors corresponding to the gamut of the image shooting device; and an image conversion unit configured to generate an output image of the output imaging device, of which colors are matched with those of the image inputted from the image shooting device, using the lookup table.

The characterization models may include a transformation matrix which converts colors corresponding to an RGB space of the image shooting device or the output imaging device into colors of a CIEXYZ space, or an inverse matrix of the transformation matrix.

The color conversion unit may convert the colors of the RGB space, corresponding to the gamut of the image shooting device, into the colors of the CIEXYZ space using the characterization model of the image shooting device, and convert the colors of the CIEXYZ space into the colors of the RGB space, corresponding to the gamut of the image shooting device, using the characterization model of the output imaging device.

The apparatus may further include a gamut mapping unit configured to map colors corresponding to the gamut of the image shooting device onto colors of the output imaging device, based on the color conversion information using the characterization models of the image shooting device and the output imaging device. According to the embodiment, the color conversion unit may include the gamut mapping unit.

The lookup table generation unit may generate the lookup table based on the gamut mapping information of the gamut mapping unit.

The lookup table may include a full 3D lookup table which has a color depth of 10 bits for each channel for colors in an RGB space and is not compressed.

The image conversion unit may convert colors contained in the image inputted from the image shooting device into the colors corresponding to the gamut of the output imaging device using the lookup table.

The apparatus may further include a gamut extraction unit configured to extract gamut information on the image shooting device from an image in which a color patch is shot by the image shooting device, the color patch serving as a reference for gamut information extraction, and extract gamut information on the output imaging device based on color measurement information of the color patch image outputted on a screen of the output imaging device.

In accordance with another embodiment of the present invention, a method for matching colors between various image devices includes: generating characterization models for color conversion of an image shooting device and an output imaging device using gamut information on the image shooting device and the output imaging device; converting all colors corresponding to a gamut of the image shooting device into colors corresponding to a gamut of the output imaging device using the characterization models; generating a lookup table between the image shooting device and the output imaging device based on the color conversion information of the colors corresponding to the gamut of the image shooting device; and generating an output image of the output imaging device, which is color-matched with an image inputted from the image shooting device, using the lookup table.

The characterization models may include a transformation matrix which converts colors corresponding to an RGB space of the image shooting device or the output imaging device into colors in a CIEXYZ space, or an inverse matrix of the transformation matrix.

The converting all colors corresponding to the gamut of the image shooting device into colors corresponding to the gamut of the output imaging device using the characterization models may include: converting the colors of the RGB space, corresponding to the gamut of the image shooting device, into the colors of the CIEXYZ space using the characterization model of the image shooting device; and converting the colors of the CIEXYZ space into the colors of the RUB space, corresponding to the gamut of the output imaging device, using the characterization model of the output imaging device.

The method may further include mapping the colors corresponding to the gamut of the image shooting device onto the colors of the output imaging device, based on the color conversion information using the characterization models of the image shooting device and the output imaging device.

In the generating the lookup table between the image shooting device and the output imaging device based on the color conversion information of the colors corresponding to the gamut of the image shooting device, the lookup table may be generated based on the gamut mapping information of the mapping the colors corresponding to the gamut of the image shooting device onto the colors of the output imaging device, based on the color conversion information using the characterization models of the image shooting device and the output imaging device.

The lookup table may include a full 3D lookup table which has a color depth of 10 bits for each channel for colors in an RGB space and is not compressed.

The generating the output image of the output imaging device, which is color-matched with the image inputted from the image shooting device, using the lookup table may include converting colors contained in the image inputted from the image shooting device into the colors corresponding to the gamut of the output imaging device using the lookup table.

The method may further include extracting gamut information on the image shooting device from an image in which a color patch is shot by the image shooting device, the color patch serving as a reference of gamut information extraction, and extracting gamut information on the output imaging device based on color measurement information of the color patch image outputted on a screen of the output imaging device.

DESCRIPTION OF SPECIFIC EMBODIMENTS

Figure 1:
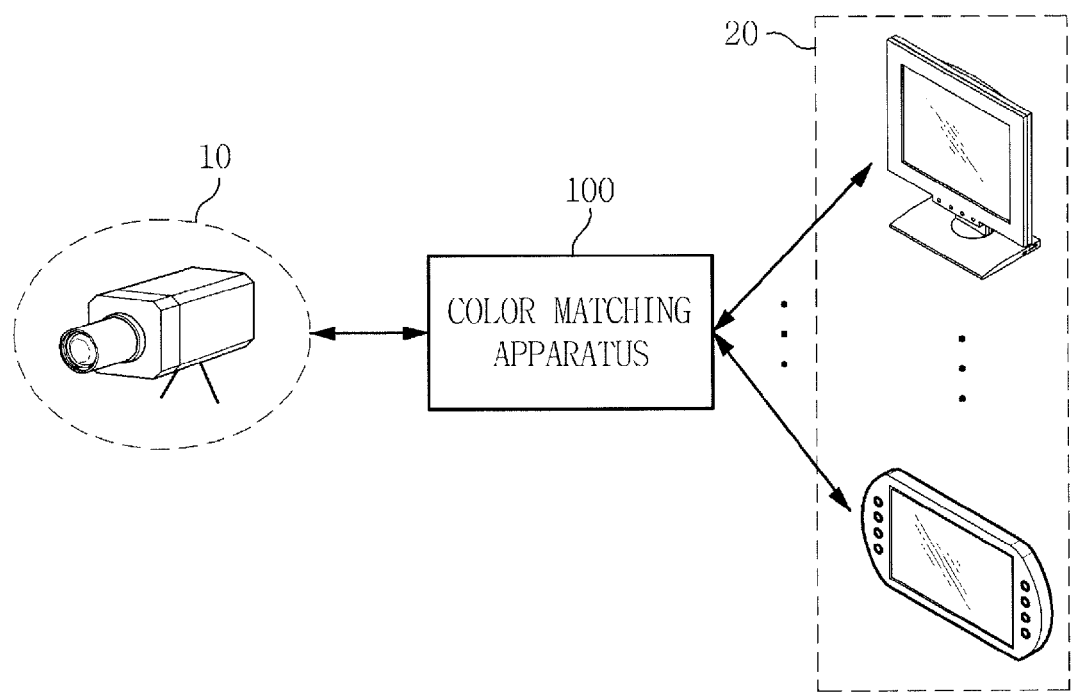
FIG. 1 is a diagram illustrating a system configuration to which an apparatus for matching colors between various image devices in accordance with an embodiment of the present invention is applied.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a diagram illustrating a system configuration to which an apparatus for matching colors between various image devices in accordance with an embodiment of the present invention is applied.

Referring to FIG. 1, the apparatus for matching colors between various image devices (hereinafter, referred to as a 'color matching apparatus') in accordance with the embodiment of the present invention performs an operation of matching colors between various image devices by mapping the gamut (color gamut) for the various image devices.

The image devices may include an input imaging device and an output imaging device 20. In this case, the color matching apparatus 100 maps the gamut of the input imaging device onto the gamut of the output imaging device 20 between the input imaging device and the output imaging device 20, and performs a color matching operation between an input image and an output image.

Here, the input imaging device may include an image shooting device 10, such as a camera or a camcorder. Furthermore, the output imaging device 20 may include a display device, such as a projector, a TV, or a monitor. The following descriptions in accordance with the embodiment of the present invention will be focused on a color matching operation between the image shooting device 10 and the output imaging device 20.

Therefore, when an image shot by the image shooting device 10 is outputted by a plurality of output imaging devices 20, the color matching apparatus 100 performs color conversion such that the respective output imaging devices 20 may output the gamut of the image shot by the image shooting device 10 as it is. Moreover, the color matching apparatus 100 may perform color conversion between the output imaging devices 20 such that the output imaging devices 20 output the matched color.

The detailed configuration of the color matching apparatus 100 will be described with reference to FIG. 2.

Figure 2:
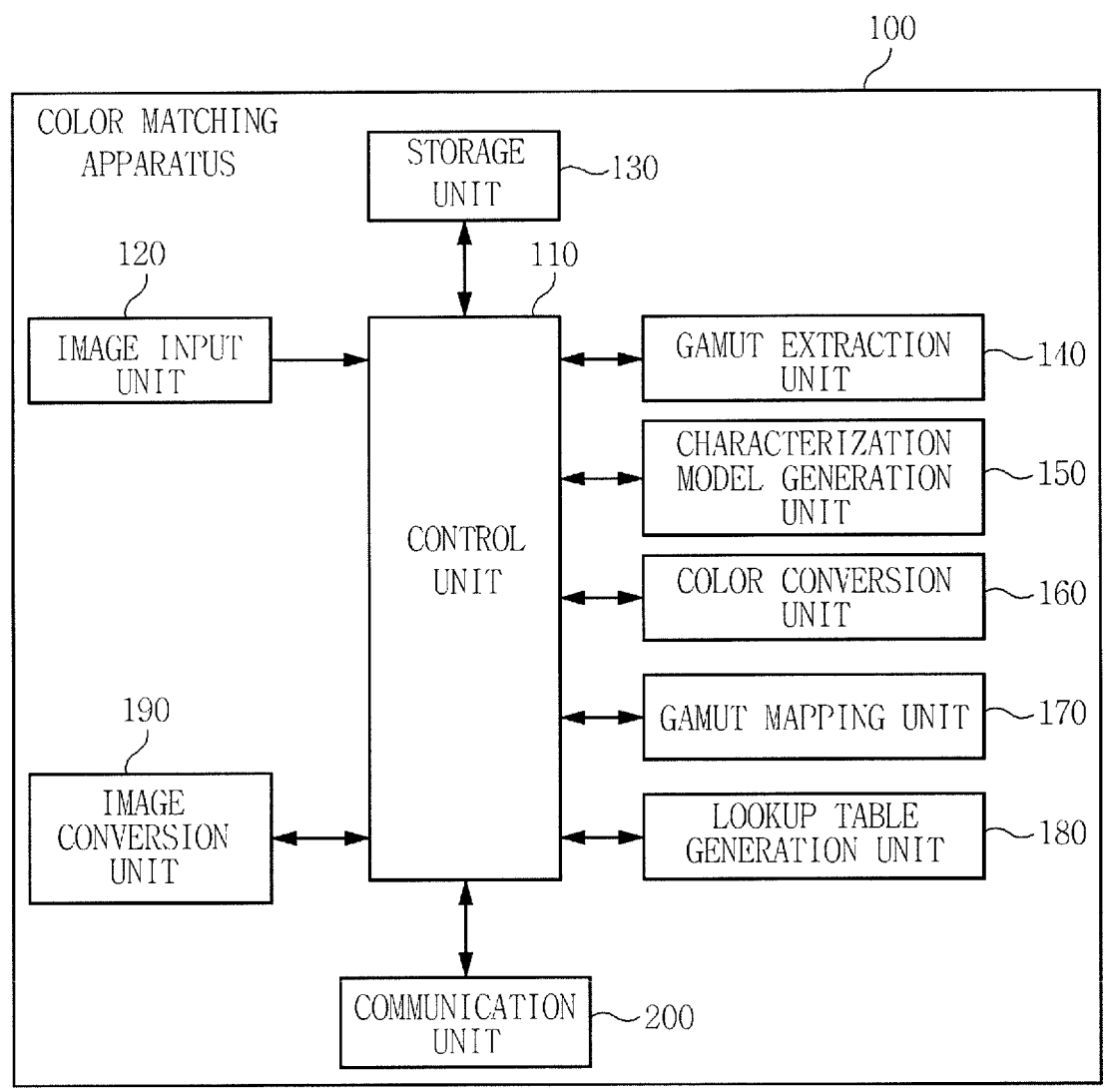
FIG. 2 is a block diagram explaining the configuration of the color matching apparatus between various image devices in accordance with the embodiment of the present invention.

FIG. 2 is a block diagram explaining the configuration of the color matching apparatus between various image devices in accordance with the embodiment of the present invention.

Referring to FIG. 2, the color matching apparatus 100 in accordance with the embodiment of the present invention includes a control unit 110, an image input unit 120, a storage unit 130, a gamut extraction unit 140, a characterization model generation unit 150, a color conversion unit 160, a gamut mapping unit 170, a lookup table generation unit 180, and an image conversion unit 190. Here, the control unit 110 is configured to control the operations of the respective units of the color matching apparatus 100.

The image input unit 120 is configured to receive an image shot by the image shooting device 10. The image shooting device 10 shoots a color patch which serves as the reference for color conversion, in order to extract gamut information of the image shooting device 10. In this case, the image input unit 120 receives the color patch shot by the image shooting device 10.

The storage unit 130 is configured to store an image inputted to the color matching apparatus 100 and an output image of which the color is converted by the color matching apparatus 100. Furthermore, the storage unit 130 stores gamut information on the image shooting device 10 and the output imaging device 20. Furthermore, the storage unit 130 stores a lookup table for color conversion of an input image in the color matching apparatus 100.

When a color patch shot by an image shooting device 10 is inputted, the gamut extraction unit 140 extracts the gamut information of the image shooting device 10 from the color patch inputted from the corresponding image shooting device 10.

Furthermore, the gamut extraction unit 140 extracts gamut information of an output imaging device 20 based on color patch output information of the corresponding output imaging device 20. Here, the output imaging device 20 receives the color patch image to display on a screen. In this case, the color matching apparatus 100 measures a color patch output state of the output imaging device 20 using a separate measuring instrument. Therefore, the gamut extraction unit 140 extracts the gamut information of the output imaging device 20 based on the measurement information from the measuring instrument.

The characterization model generation unit 150 is configured to generate a characterization model for converting a color-dependent color space into a color-independent color space. In other words, the characterization model generation unit 150 generates a characterization model capable of converting an ROB space (color-dependent color space) into a CIEXYZ space (color-independent color space).

Here, the CIEXYZ space is a three-dimensional coordinate system representing mathematical positions on a coordinate system proposed by the International Commission on Illumination (CIE). In the CIEXYX space, all colors that are recognized by the human eye may be expressed.

The characterization model applied to the embodiment of the present invention is a transformation matrix, which converts colors corresponding to an RGB space of an image shooting device or output imaging device into the colors of a CIEXYZ space, or an inverse matrix of the transformation matrix.

The characterization model generation unit 150 is configured to generate a characterization model by using the gamut information of the image shooting device 10 and the output imaging device 20, which is extracted by the gamut extraction unit 140.

In this case, the characterization model of the image shooting device 10 is a matrix which converts colors of an RGB space into colors of a CIEXYZ space (hereinafter, referred to as an 'XYX space'). Meanwhile, the characterization model of the output imaging device 20 is a matrix which converts colors of an XYZ space into colors of an RGB space. Here, the characterization model of the output imaging device 20 has an inverse matrix form of the characterization model of the image shooting device 10. The characterization model generation unit 150 automatically generates coefficients based on a characterization scheme.

The color conversion unit 160 is configured to convert colors of an RGB space into colors of an XYZ space using the characterization model of the characterization model generation unit 150, and to convert the colors of the XYZ space into the colors of the RGB space.

That is, the color conversion unit 160 converts the colors of the RGB space, which correspond to the gamut of the image shooting device 10, into the colors of the XYZ space using the characterization model of the image shooting device 10. Furthermore, the color conversion unit 160 converts the colors of the XYZ space, which were converted using the characterization model of the image shooting device 10, into the colors of the RGB space, which correspond to the gamut of the output imaging device 20, using the characterization model of the output imaging device 20.

In this case, the colors of the RGB space, which are converted using the characterization model of the output imaging device 20, are converted into colors of an R'G'B' space, which are different from the colors of the RGB space of the image shooting device 10.

The gamut mapping unit 170 is configured to map the gamuts of the image shooting device 10 and the output imaging device 20 for the color patch, based on the color conversion information of the characterization models of the image shooting device 10 and the output imaging device 20.

For example, the gamut mapping unit 170 maps a color of $R_0G_0B_0$ in the gamut of the image shooting device 10 to a color of $R'_0G'_0B'_0$ corresponding to the case in which color conversion is performed using the characterization model of the image shooting device 10 and the characterization model of the output imaging device 20.

Similarly, the gamut mapping unit 170 maps a color of $R_nG_nB_n$ in the gamut of the image shooting device 10 to a color of $R'_nG'_nB'_n$ corresponding to the case in which color conversion is performed using the characterization model of the image shooting device 10 and the characterization model of the output imaging device 20.

The lookup table generation unit 180 is configured to generate a lookup table using the gamut mapping information between the image shooting device 10 and the output imaging device 20 by the gamut mapping unit 170.

In order to convert a digital cinema image at high speed, it is necessary to use a lookup table. As a lookup table for digital cinema, a full 3D lookup table may be used to perform high-speed image conversion without the loss of image data. The full 3D lookup table has a color depth of 10 bits for each channel of an RGB color and is not compressed.

In this case, the RGB colors having a color depth of 10 bits may represent about one billion (1024*1024*1024) colors, and the lookup table for the RGB colors should have mapping values for about one billion colors.

Therefore, the gamut mapping unit 170 performs gamut mapping for all colors in the gamuts of the image shooting device 10 and the output imaging device 20, and the lookup table generation unit 180 generates a lookup table for all colors.

The image conversion unit 190 is configured to perform a color matching operation between the image shooting device 10 and the output imaging device 20 using the full 3D lookup table.

In other words, when an image shot by the image shooting device 10 is inputted, the image conversion unit 190 extracts all colors contained in the inputted image. Furthermore, the image conversion unit 190 performs a color matching operation between the image shooting device 10 and the output imaging device 20 by converting the colors extracted from the inputted image into colors of an RGB space corresponding to the gamut of the output imaging device 20 using the full 3D lookup table. Moreover, the image conversion unit 190 may perform the color matching operation between the output imaging devices 20 using the full 3D lookup table.

Accordingly, the output imaging device 20 may output an image of which colors are matched with that of the image shooting device 10.

Figure 3:
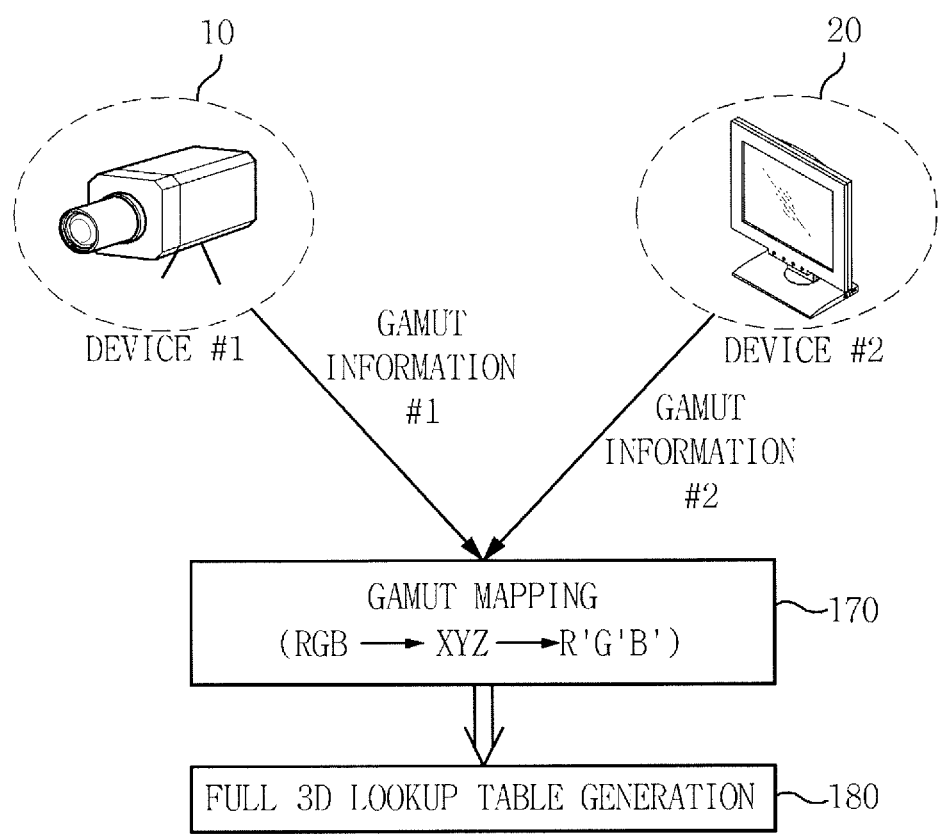
FIG. 3 is a diagram explaining an operation of generating a lookup table in accordance with the embodiment of the present invention.

FIG. 3 is a diagram explaining the operation of generating a lookup table in accordance with the embodiment of the present invention.

Referring to FIG. 3, the color matching apparatus 100 in accordance with the embodiment of the present invention maps the gamuts of a device #1 and a device #2 using gamut information #1 of the device #1 and gamut information #2 of the device #2.

In this case, the device #1 corresponds to a source device including image shooting devices 10 such as cameras, and the device #2 corresponds to a target device including output imaging devices 20 such as monitors. However, both of the device #1 and the device #2 may correspond to output imaging devices 20 according to the embodiment of the invention.

Here, the color matching apparatus 100 generates characterization models for the device #1 and the device #2 from the gamut information #1 and the gamut information #2, respectively, and maps colors of an RGB space of the device #1 to colors of an R'G'B' space of the device #2 using the generated characterization models.

In other words, the color matching apparatus 100 performs device-independent color space conversion (RGB to XYZ) for the colors of the RGB space of the device #1 using the characterization model of the device #1. Furthermore, the color matching apparatus 100 maps the gamuts of the device #1 and the device #2 by performing device-dependent color space conversion (XYZ to RGB) using the characterization model of the device #2.

Figures 4, 5:
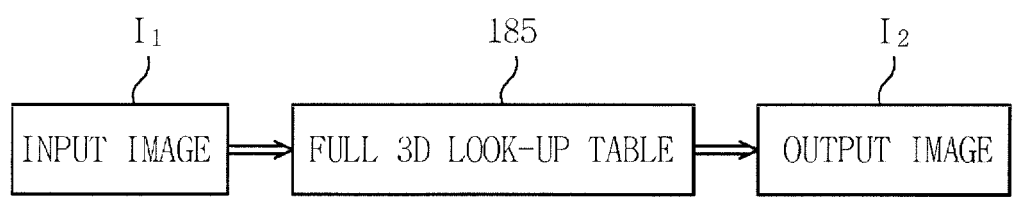
FIG. 4 shows an example of a lookup table in accordance with the embodiment of the present invention.
FIG. 5 is a diagram explaining an image conversion operation in accordance with the embodiment of the present invention.

In this case, the color matching apparatus 100 generates a full 3D lookup table based on the gamut mapping information of the devices #1 and #2 (refer to FIG. 4, for an example of a full 3D lookup table).

FIG. 4 shows an example of the lookup table in accordance with the embodiment of the present invention.

Referring to FIG. 4, the full 3D lookup table is generated for the device #1 as the source device and the device #2 as the target device.

For example, a color of $R_0G_0B_0$ in the gamut of the device #1 corresponds to a color of $R'_0G'_0B_0$ in the gamut of the device #2. Furthermore, a color of $R_1G_1B_1$ in the gamut of the device #1 corresponds to a color of $R'_1G'_1B'_1$ in the gamut of the device #2.

Therefore, the color matching apparatus 100 associates all of the colors corresponding to the gamut of the device #1 with the respective colors corresponding to the gamut of the device #1, thereby completing the full 3D lookup table.

Furthermore, when an image shot by the device #1 is to be outputted through a device #n as another output imaging device 20, the color matching apparatus 100 generates a lookup table for the device #1 and the device #n.

FIG. 5 is a diagram explaining the image conversion operation in accordance with the embodiment of the present invention.

Referring to FIG. 5, the color matching apparatus 100 in accordance with the embodiment of the present invention applies the full 3D lookup table of FIG. 4 to convert the colors of an image inputted from the source device and outputs the color-converted image to the target device, thereby acquiring the image of which colors are matched between the source device and the target device.

In other words, when an image shot by the device #1 of FIGS. 3 and 4 is inputted to the color matching apparatus 100, the color matching apparatus 100 converts the colors of the image shot by the device #1 into colors corresponding to the gamut of the device #2 using the full 3D lookup table generated for the device #1 and the device #2.

The color matching apparatus 100 outputs the image, of which colors are matched between the device #1 and the device #2, to the device #2. Therefore, the device #2 may output an image of which colors are matched with that of the device #1.

Figure 6:
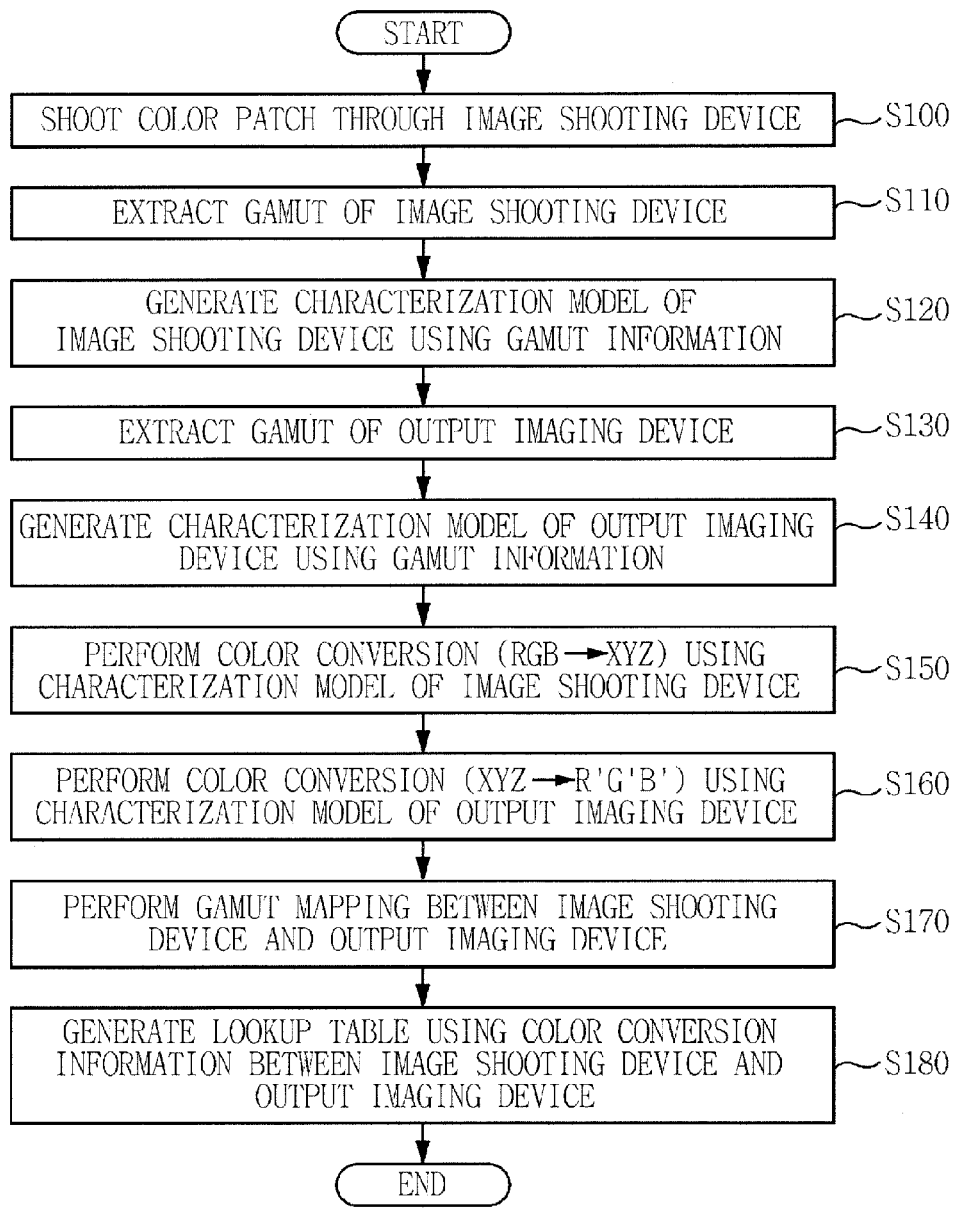
FIGS. 6 and 7 are flow charts showing a method for matching colors between various image devices in accordance with another embodiment of the present invention.
Figure 7:
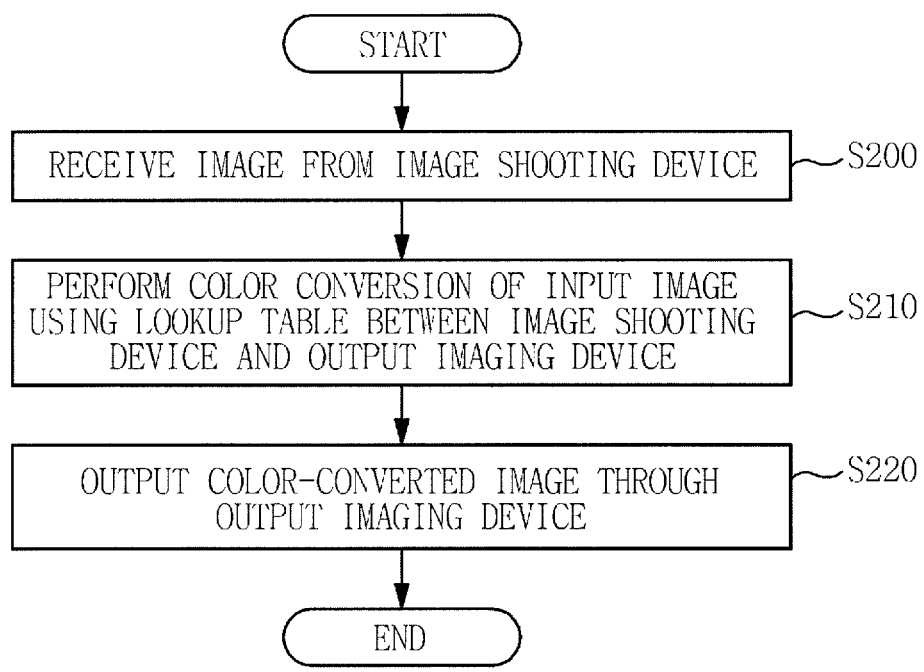

FIGS. 6 and 7 are flow charts showing a method for matching colors between various image devices in accordance with another embodiment of the present invention.

FIG. 6 shows a process of generating a lookup table for color matching. Referring to FIG. 6, when a color patch serving as the reference of gamut information extraction is shot by an image shooting device 10 at step S100, the color matching apparatus 100 extracts gamut information of the corresponding image shooting device 10 through the color patch image at step S110.

In this case, the color matching apparatus 100 generates a characterization model of the image shooting device 10, that is, a transformation matrix using the gamut information extracted at step S110, at step S120.

Meanwhile, the output imaging device 20 outputs the color patch image serving as the reference of gamut information extraction through a screen. In this case, a measuring instrument is used to measure the color patch image outputted on the screen of the output imaging device 20. The color matching apparatus 100 extracts gamut information of the output imaging device 20 using the information measured by the measuring instrument at step S130.

In this case, the color matching apparatus 100 generates a characterization model of the output imaging device 20, that is, a transformation matrix using the gamut information extracted at step S130, at step S140.

The color matching apparatus 100 converts the colors of an RGB space corresponding to the gamut of the image shooting device 10 into the colors of an XYZ space using the characterization model of the image shooting device 10, which was generated at step S120, at step S150.

Furthermore, the color matching apparatus 100 converts the colors converted at step S150 into the colors of the RGB space corresponding to the gamut of the image shooting device 10 by using the characterization model of the output imaging device 20, which was generated at step S140, at step S160.

Therefore, the color matching apparatus 100 maps the gamuts of the image shooting device 10 and the output imaging device 20, based on the color conversion information of steps S150 and S160, at step S170. Then, the color matching apparatus 100 generates a lookup table between the image shooting device 10 and the output imaging device 20 using the gamut mapping information obtained at step S170, at step S180.

Meanwhile, FIG. 7 shows a process of performing a color matching operation using the lookup table generated according to FIG. 6. Referring to FIG. 7, when an image shot by the image shooting device 10 is inputted at step S200, the color matching apparatus 100 extracts all colors contained in the inputted image.

Then, the color matching apparatus 100 converts the colors extracted from the inputted image into colors corresponding to the gamut of the output imaging device 20 using the lookup table generated at step S180 of FIG. 6, at step S210. In this case, the color matching apparatus 100 transmits the image, of which colors were converted at step S210, to the output imaging device 20, thereby outputting the color-converted image through the output imaging device 20, at step S220.

Accordingly, a user may check the output image through the various output imaging devices 20 as the gamut of the output image.

In accordance with the exemplary embodiments of the present invention, all operators may perform their work while observing the same colors through their own output devices.

Furthermore, since the colors images shown in respective theaters have the same colors, the intention of the director with respect to the colors may be properly delivered to audiences.

While the present invention has been described with respect to the specific embodiments, it will be apparent to those skilled in the art that various changes and modifications may be made without departing from the spirit and scope of the invention as defined in the following claims.

What is claimed is:

1. An apparatus for matching colors between various image devices, comprising:
   a characterization model generation unit configured to generate characterization models for color conversion of an image shooting device and an output imaging device using gamut information on the image shooting device and the output imaging device;
   a color conversion unit configured to convert all colors corresponding to a gamut of the image shooting device into colors corresponding to a gamut of the output imaging device using the characterization models;
   a lookup table generation unit configured to generate a lookup table between the image shooting device and the output imaging device based on color conversion information of the colors corresponding to the gamut of the image shooting device; and
   an image conversion unit configured to generate an output image of the output imaging device, of which the colors are matched with those of the image inputted from the image shooting device, using the lookup table; and
   a gamut extraction unit configured to extract gamut information on the image shooting device from an image in which a color patch is shot by the image shooting device, the color patch serving as a reference of gamut information extraction, and extract gamut information on the output imaging device based on color measurement information of the color patch image outputted on a screen of the output imaging device.

2. A non transitory computer readable medium (CRM) containing programming instructions that cause a processor to perform a method for matching colors between various image devices, comprising:
   generating characterization models for color conversion of an image shooting device and an output imaging device using gamut information on the image shooting device and the output imaging device;
   converting all colors corresponding to a gamut of the image shooting device into colors corresponding to a gamut of the output imaging device using the characterization models;
   generating a lookup table between the image shooting device and the output imaging device based on color conversion information of the colors corresponding to the gamut of the image shooting device; and
   generating an output image of the output imaging device, which is color-matched with an image inputted from the image shooting device, using the lookup table; and
   having programming instructions of extracting gamut information on the image shooting device from an image in which a color patch is shot by the image shooting device, the color patch serving as a reference of gamut information extraction, and having programming instructions of extracting gamut information on the output imaging device based on color measurement information of the color patch image outputted on a screen of the output imaging device.

3. An apparatus for matching colors between various image devices, comprising:
   a characterization model generation unit configured to generate characterization models for color conversion between output imaging devices;
   a color conversion unit configured to perform color conversion using gamut information on the output imaging devices;
   a lookup table generation unit configured to generate a lookup table between the output imaging devices based on color conversion information of the color conversion unit; and
   an image conversion unit configured to perform device-independent color space conversion; and to generate an output image of one of the output imaging devices, of which the colors are matched with those corresponding to another of the output imaging devices, using the lookup table.

4. The apparatus of claim 3, wherein the characterization models comprise at least one of a transformation matrices, which converts colors corresponding to an RGB space of the output imaging devices into colors of a CIEXYZ space, and an inverse matrix of the transformation matrix.

5. The apparatus of claim 3, wherein the lookup table is a full 3D lookup table which has a color depth of 10 bits for each channel for colors in an RGB space and is not compressed.

6. The apparatus of claim 3 wherein the output image of each of the output imaging devices have the same color.

7. The apparatus of claim 1, wherein the characterization models comprise at least one of a transformation matrices, which converts colors corresponding to an RGB space of the image shooting device or the output imaging device into colors of a CIEXYZ space, and an inverse matrix of the transformation matrix.

8. The apparatus of claim 7, wherein the color conversion unit converts the colors of the RGB space, corresponding to the gamut of the image shooting device, into the colors of the CIEXYZ space using the characterization model of the image shooting device, and converts the colors of the CIEXYZ space into the colors of the RGB space, corresponding to the gamut of the image output device, using the characterization model of the output imaging device.

9. The apparatus of claim 1, further comprising:
   a gamut mapping unit configured to map colors corresponding to the gamut of the image shooting device to colors of the output imaging device, based on the color conversion information using the characterization models of the image shooting device and the output imaging device.

10. The apparatus of claim 9, wherein the lookup table generation unit generates the lookup table based on the gamut mapping information of the gamut mapping unit.

11. The apparatus of claim 1, wherein the lookup table is a full 3D lookup table which has a color depth of 10 bits for each channel for colors in an RGB space and is not compressed.

12. The apparatus of claim 1, wherein the image conversion unit converts colors contained in the image inputted from the image shooting device into the colors corresponding to the gamut of the output imaging device, using the lookup table.

13. The CRM method of claim 2, wherein the characterization models comprise a transformation matrix which converts colors corresponding to an RGB space of the image shooting device or the output imaging device into colors of a CIEXYZ space, or an inverse matrix of the transformation matrix.

14. The CRM method of claim 13, wherein the converting all colors corresponding to the gamut of the image shooting device into colors corresponding to the gamut of the output imaging device using the characterization models comprises:
   having coded instructions of converting the colors of the RGB space, corresponding to the gamut of the image shooting device, into the colors of the CIEXYZ space using the characterization model of the image shooting device; and
   having coded instructions of converting the colors of the CIEXYZ space into the colors of the RGB space, corresponding to the gamut of the output imaging device, using the characterization model of the output imaging device.

15. The CRM method of claim 2, further comprising:
   having coded instructions of mapping the colors corresponding to the gamut of the image shooting device to the colors of the output imaging device, based on the color conversion information using the characterization models of the image shooting device and the output imaging device.

16. The CRM method of claim 15, wherein the generating the lookup table generates the lookup table based on the gamut mapping information of the mapping the colors corresponding to the gamut of the image shooting device onto the colors of the output imaging device.

17. The CRM method of claim 2, wherein the lookup table is a full 3D lookup table which has a color depth of 10 bits for each channel for colors in an RGB space and is not compressed.

18. The CRM method of claim 2, wherein the generating the output image of the output imaging device, which is color-matched with the image inputted from the image shooting device, using the lookup table comprises converting colors contained in the image inputted from the image shooting device into the colors corresponding to the gamut of the output imaging device using the lookup table.

* * * * *